(12) United States Patent
Jiang et al.

(10) Patent No.: US 11,736,044 B2
(45) Date of Patent: Aug. 22, 2023

(54) BRAKE CONTROL SYSTEM OF MOTOR

(71) Applicant: ANPEC ELECTRONICS CORPORATION, Hsinchu (TW)

(72) Inventors: Jyun-Ping Jiang, Hsinchu (TW); Shih-Hai Chien, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/669,495

(22) Filed: Feb. 11, 2022

(65) Prior Publication Data

US 2023/0198431 A1   Jun. 22, 2023

(30) Foreign Application Priority Data

Dec. 17, 2021   (TW) .................................. 110147320

(51) Int. Cl.
*H02P 3/10*   (2006.01)
*H02P 3/20*   (2006.01)

(52) U.S. Cl.
CPC ...................................... *H02P 3/20* (2013.01)

(58) Field of Classification Search
CPC ................. H02P 3/20; H02P 3/14; H02P 3/00
See application file for complete search history.

(56) References Cited

FOREIGN PATENT DOCUMENTS

| CN | 115303246 A | * 11/2022 |
|---|---|---|
| TW | 200533054 A | 10/2005 |
| TW | 201824730 A | 7/2018 |

* cited by examiner

*Primary Examiner* — Karen Masih
(74) *Attorney, Agent, or Firm* — Li & Cai Intellectual Property (USA) Office

(57) ABSTRACT

A brake control system of a motor is provided. When a control circuit intends to brake the motor, the control circuit controls a driver circuit to turn off a first high-side switch and a second high-side switch, and to fully turn on the first low-side switch and the second low-side switch, for a period of time. Then, the control circuit controls the driver circuit to turn off one of the first low-side switch and the second low-side switch, and to continually turn on the other one of the first low-side switch and the second low-side switch, for a period of time. Then, the control circuit controls the driver circuit to turn off the other one of the first low-side switch and the second low-side switch, and to turn on the one of the first low-side switch and the second low-side switch, for a period of time.

9 Claims, 6 Drawing Sheets

BRAKE CONTROL SYSTEM OF MOTOR

CROSS-REFERENCE TO RELATED PATENT APPLICATION

This application claims the benefit of priority to Taiwan Patent Application No. 110147320, filed on Dec. 17, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a brake control system of the motor.

BACKGROUND OF THE DISCLOSURE

Circuit components of electronic products produce heat during operation, by which air circulated throughout an enclosed space, especially in an enclosed chassis of a server, is heated up. As a result, other circuit components are damaged due to overheating. Therefore, fans must be disposed in the electronic products and used to cool down the circuit components of the electronic products. When a temperature of each of the circuit components of the electronic product is cooled down to be lower than a temperature threshold, a rotational speed of a motor of the fan can be appropriately decreased. However, a conventional control system only can slowly decrease the rotational speed of the motor. As a result, the motor rotates unexpectedly for a very long period of time while an additional power consumption occurs in the motor.

SUMMARY OF THE DISCLOSURE

In response to the above-referenced technical inadequacies, the present disclosure provides a braking controller system of a motor. The braking controller system includes a first high-side switch, a first low-side switch, a second high-side switch, a second low-side switch, a driver circuit and a control circuit. A first terminal of the first high-side switch is coupled to an input voltage. A first terminal of the first low-side switch is connected to a second terminal of the first high-side switch. A second terminal of the first low-side switch is grounded. A node between the first terminal of the first low-side switch and the second terminal of the first high-side switch is connected to a first terminal of the motor. A first terminal of the second high-side switch is coupled to the input voltage. A first terminal of the second low-side switch is connected to a second terminal of the high-side switch. A second terminal of the second low-side switch is grounded. A node between the first terminal of the second low-side switch and the second terminal of the second high-side switch is connected to a second terminal of the motor. The driver circuit is connected to a control terminal of the first high-side switch, a control terminal of the first low-side switch, a control terminal of the second high-side switch and a control terminal of the second low-side switch. The control circuit is connected to the driver circuit. When the control circuit intends to brake the motor, the control circuit controls the driver circuit to sequentially execute a brake deceleration operation and a first braking rest operation. In the brake deceleration operation, the control circuit controls the driver circuit to turn off the first high-side switch and the second high-side switch and to fully turn on the first low-side switch and the second low-side switch, or the control circuit controls the driver circuit to turn on the first high-side switch and the second high-side switch and to turn off the first low-side switch and the second low-side switch. In the first braking rest operation, the control circuit controls the driver circuit to turn off the first high-side switch and the second high-side switch, to turn off one of the first low-side switch and the second low-side switch, and to fully turn on the other one of the first low-side switch and the second low-side switch.

In certain embodiments, the control circuit controls the driver circuit to sequentially execute the brake deceleration operation, the first braking rest operation and a second braking rest operation. In the second braking rest operation, the control circuit controls the driver circuit to turn off the first high-side switch and the second high-side switch, to turn off the other one of the first low-side switch and the second low-side switch, and to fully turn on the one of the first low-side switch and the second low-side switch.

In certain embodiments, the control circuit controls the driver circuit to sequentially execute the brake deceleration operation, the first braking rest operation and the second braking rest operation multiple times until a rotational speed of the motor is decreased to reach a target rotational speed.

In certain embodiments, when the control circuit determines that the rotational speed of the motor is decreased to be lower than a speed threshold, the control circuit controls the driver circuit to stop executing the first braking rest operation and the second braking rest operation, and then to start executing the brake deceleration operation until the rotational speed of the motor is decreased to reach the target rotational speed.

In certain embodiments, the control circuit controls the driver circuit to execute a plurality of brake loop operations. In each of the brake loop operations, the control circuit controls the driver circuit to execute the brake deceleration operation once, and then to sequentially execute the first braking rest operation and the second braking rest operation once or multiple times.

In certain embodiments, the braking controller system further includes a Hall sensor. The Hall sensor is connected to the control circuit. The Hall sensor is configured to sense a positive voltage and a negative voltage that are generated with a change in magnetic field strength from rotation of a rotor of the motor to output a Hall signal. The control circuit controls the driver circuit based on the Hall signal.

In certain embodiments, when a current time reaches one of transition time points of the Hall signal, the driver circuit starts executing the brake deceleration operation. When the current time reaches a next one of the transition time points of the Hall signal, the driver circuit stops executing the brake deceleration operation and starts executing the first braking rest operation. When the current time reaches a further next one of the transition time points of the Hall signal, the driver circuit stops executing the first braking rest operation and starts executing the second braking rest operation.

In certain embodiments, the one of the transition time points, the next one of the transition time points and the further next one of the transition time points are time points of rising edges or falling edges of waves of the Hall signal.

In certain embodiments, when the control circuit determines that the Hall signal reaches a first level, the control circuit controls the driver circuit to turn off the first high-side switch and the second high-side switch, to fully turn on the first low-side switch, and to turn off the second low-side switch. When the control circuit determines that the Hall signal reaches a second level that is different from the first level, the control circuit controls the driver circuit to turn off the first high-side switch and the second high-side switch, to fully turn on the second low-side switch, and to turn off the first low-side switch.

As described above, the present disclosure provides the braking controller system of the motor, which has at least the following characteristics:

when the rotational speed of the motor is intended to be quickly decreased, the brake deceleration operation is executed such that the first high-side switch and the second high-side switch are fully turned off and the first low-side switch and the second low-side switch are fully turned on for periods of times, or the first high-side switch and the second high-side switch are fully turned on and the first low-side switch and the second low-side switch are fully turned off for periods of times;

after the brake deceleration operation is executed for periods of times, the braking rest operations are executed, for example, in the braking rest operations, the first low-side switch and the second low-side switch are complementarily switched once or multiple times, thereby preventing the first low-side switch and the second low-side switch from being damaged due to overheating;

when the rotational speed of the motor is decreased to be lower than the speed threshold and the current flowing through the bridge circuit is decreased to be lower than current threshold, the first low-side switch and the second low-side switch can be continually turned on such that the rotational speed of the motor MT is more quickly decreased to reach the target rotational speed; and if the first high-side switch and the second high-side switch are continually turned off in the brake deceleration operation and the braking rest operations, the current cannot flow from the bridge circuit to the input voltage.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
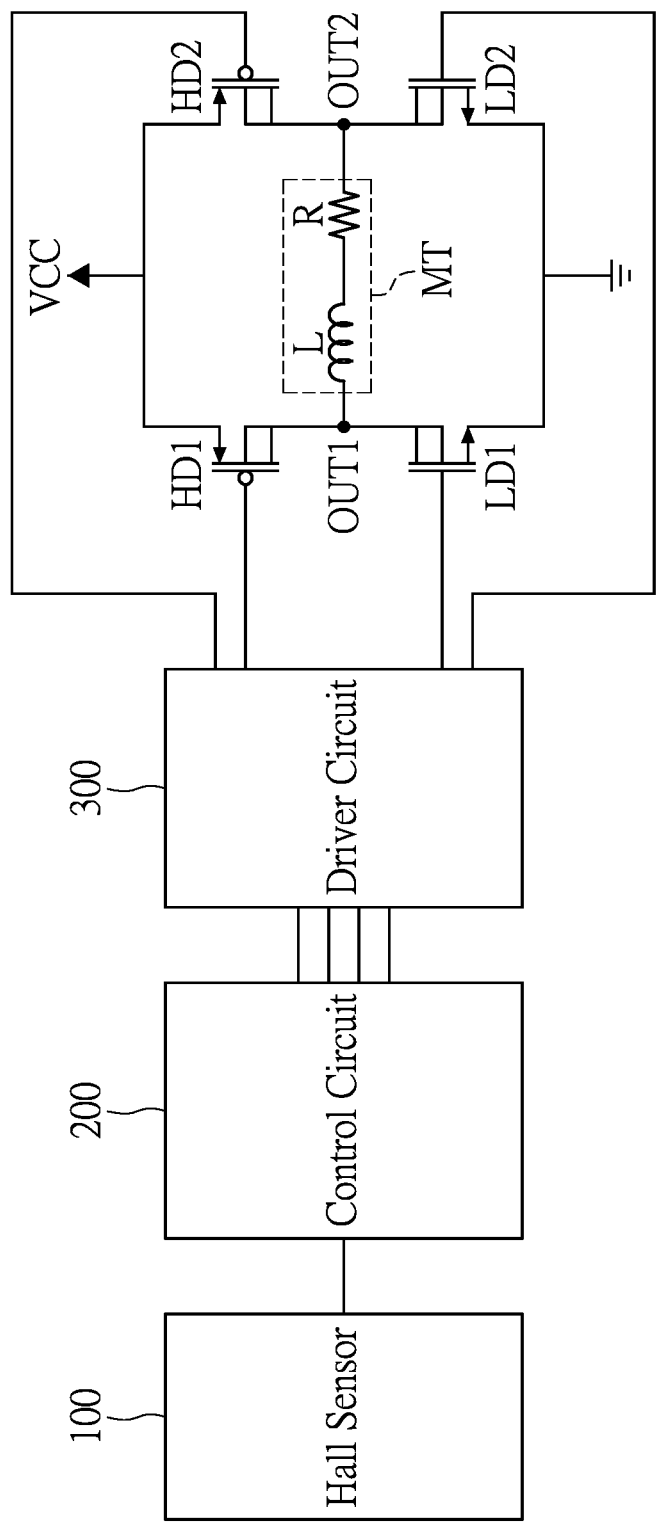
FIG. 1 is a block diagram of a brake control system of a motor according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from the other only, and are not intended to, nor should be construed to impose any substantive limitations on the components, signals or the like.

Figure 2:
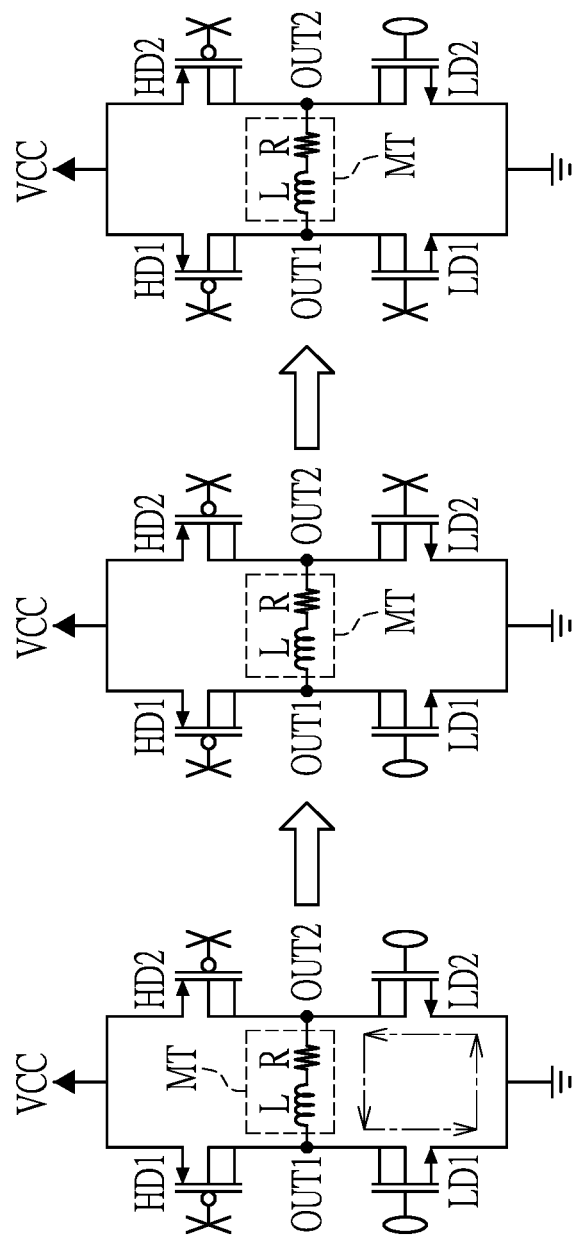
FIG. 2 is a schematic diagram of switching of a bridge circuit of the brake control system of the motor according to the embodiment of the present disclosure.
Figure 3:
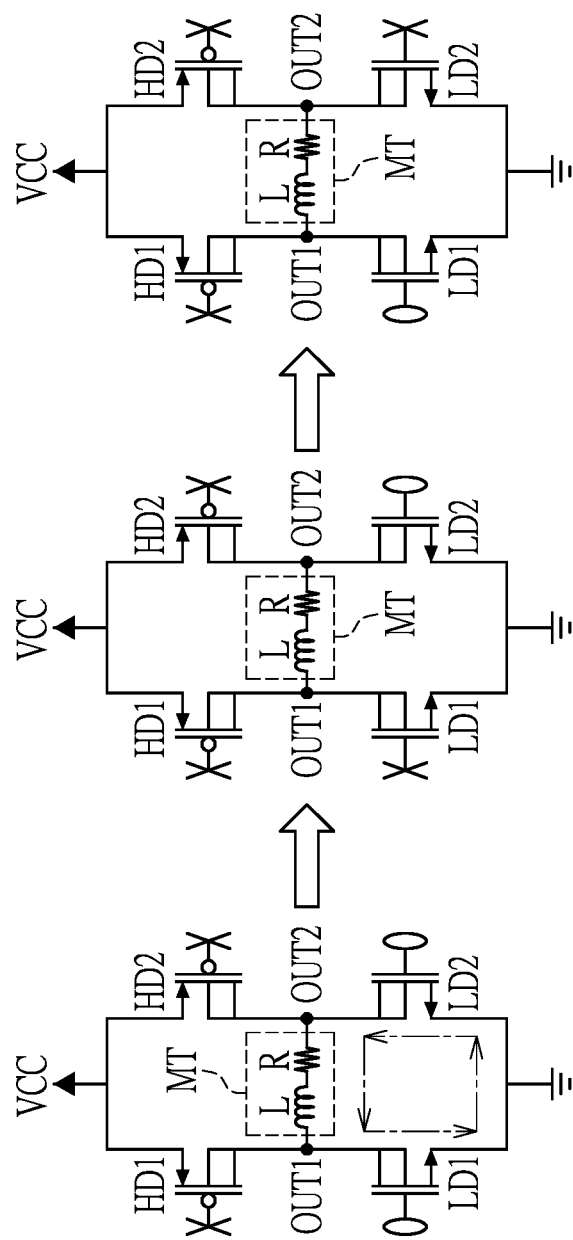
FIG. 3 is a schematic diagram of switching of the bridge circuit of the brake control system of the motor according to the embodiment of the present disclosure.

Reference is made to FIGS. 1 to 3, in which FIG. 1 is a block diagram of a brake control system of a motor according to an embodiment of the present disclosure, and FIGS. 2 and 3 are schematic diagrams of switching of a bridge circuit of the brake control system of the motor according to the embodiment of the present disclosure.

In the embodiment of the present disclosure, the brake control system may include a first high-side switch HD1, a first low-side switch LD1, a second high-side switch HD2, a second low-side switch LD2, the driver circuit 300 and the control circuit 200 as shown in FIG. 1. The brake control system can be used to decrease a rotational speed of a motor MT.

As shown in FIG. 1, a first terminal of the first high-side switch HD1 may be coupled to an input voltage VCC. A first terminal of the first low-side switch LD1 may be connected to a second terminal of the first high-side switch HD1. A second terminal of the first low-side switch LD1 is grounded. A node between the first terminal of the first low-side switch LD1 and the second terminal of the first high-side switch HD1 may be connected to a first terminal OUT1 of an inductor coil L of the motor MT. A second terminal of the inductor coil L may be connected to a first terminal of a resistor R. A second terminal of the resistor R may be connected to a second terminal OUT2 of the motor MT.

A first terminal of the second high-side switch HD2 may be coupled to the input voltage VCC. A first terminal of the second low-side switch LD2 may be connected to a second terminal of the high-side switch HD2. A second terminal of the second low-side switch LD2 is grounded. A node between the first terminal of the second low-side switch LD2 and the second terminal of the second high-side switch HD2 may be connected to the second terminal of the resistor R and the second terminal OUT2 of the motor MT.

The driver circuit 300 may be connected to a control terminal of the first high-side switch HD1, a control terminal of the first low-side switch LD1, a control terminal of the second high-side switch HD2 and a control terminal of the second low-side switch LD2. The control circuit 200 may be connected to the driver circuit 300.

When the control circuit 200 intends to brake the motor MT, the control circuit 200 may control the driver circuit 300 to execute a brake deceleration operation for a period of time, and then to execute a first braking rest operation for a period of time. After the control circuit 200 controls the driver circuit 300 to sequentially execute the brake deceleration operation and the first braking rest operation once, the control circuit 200 may further control the driver circuit 300 to sequentially execute the brake deceleration operation and the first braking rest operation once or multiple times.

In the brake deceleration operation, the control circuit 200 controls the driver circuit 300 to drive the first high-side switch HD1, the second high-side switch HD2, the first low-side switch LD1 and the second low-side switch LD2 such that a reverse current is generated and flows through the motor MT. As a result, the motor MT is braked. For example, in the brake deceleration operation of the embodiment, the control circuit 200 controls the driver circuit 300 to turn off the first high-side switch HD1 and the second high-side switch HD2, and to fully turn on the first low-side switch LD1 and the second low-side switch LD2, at the same time. Alternatively, in practice, in the brake deceleration operation, the control circuit 200 may control the driver circuit 300 to turn on the first high-side switch HD1 and the second high-side switch HD2, and to turn off the first low-side switch LD1 and the second low-side switch LD2, at the same time.

In the first braking rest operation, the control circuit 200 controls the driver circuit 300 to turn off the first high-side switch HD1 and the second high-side switch HD2, to turn off one of the first low-side switch LD1 and the second low-side switch LD2, and to fully turn on the other one of the first low-side switch LD1 and the second low-side switch LD2, at the same time.

If necessary, after the brake deceleration operation and the first braking rest operation are executed, a second braking rest operation may be executed for a period of time. In the second braking rest operation, the control circuit 200 controls the driver circuit 300 to turn off the first high-side switch HD1 and the second high-side switch HD2, to turn off the other one of the first low-side switch LD1 and the second low-side switch LD2, and to fully turn on the one of the first low-side switch LD1 and the second low-side switch LD2, at the same time.

When the control circuit 200 intends to brake the motor, the control circuit 200 may control the driver circuit 300 to sequentially execute the brake deceleration operation, the first braking rest operation and the second braking rest operation once or multiple times.

For example, in the brake deceleration operation, the control circuit 200 may control the driver circuit 300 as shown in FIG. 1 to turn off the first high-side switch HD1 and the second high-side switch HD2 and to fully turn on the first low-side switch LD1 and the second low-side switch LD2 for a period of time as shown in FIG. 2. Then, in the first braking rest operation, the control circuit 200 may control the driver circuit 300 to continually turn off the first high-side switch HD1 and the second high-side switch HD2, to turn off the second low-side switch LD2, and to fully turn on the first low-side switch LD1, for a period of time. Then, in the second braking rest operation, the control circuit 200 may control the driver circuit 300 to continually turn off the first high-side switch HD1 and the second high-side switch HD2, to turn off the first low-side switch LD1, and to fully turn on the second low-side switch LD2, for a period of time.

Alternatively, in the brake deceleration operation, the control circuit 200 may control the driver circuit 300 as shown in FIG. 1 to turn off the first high-side switch HD1 and the second high-side switch HD2 and to fully turn on the first low-side switch LD1 and the second low-side switch LD2 for a period of time as shown in FIG. 3. Then, in the first braking rest operation, the control circuit 200 may control the driver circuit 300 to continually turn off the first high-side switch HD1 and the second high-side switch HD2, to turn off the first low-side switch LD1, and to fully turn on the second low-side switch LD2, for a period of time. Then, in the second braking rest operation, the control circuit 200 may control the driver circuit 300 to continually turn off the first high-side switch HD1 and the second high-side switch HD2, to turn off the second low-side switch LD2, and to fully turn on the first low-side switch LD1, for a period of time.

Figure 4:
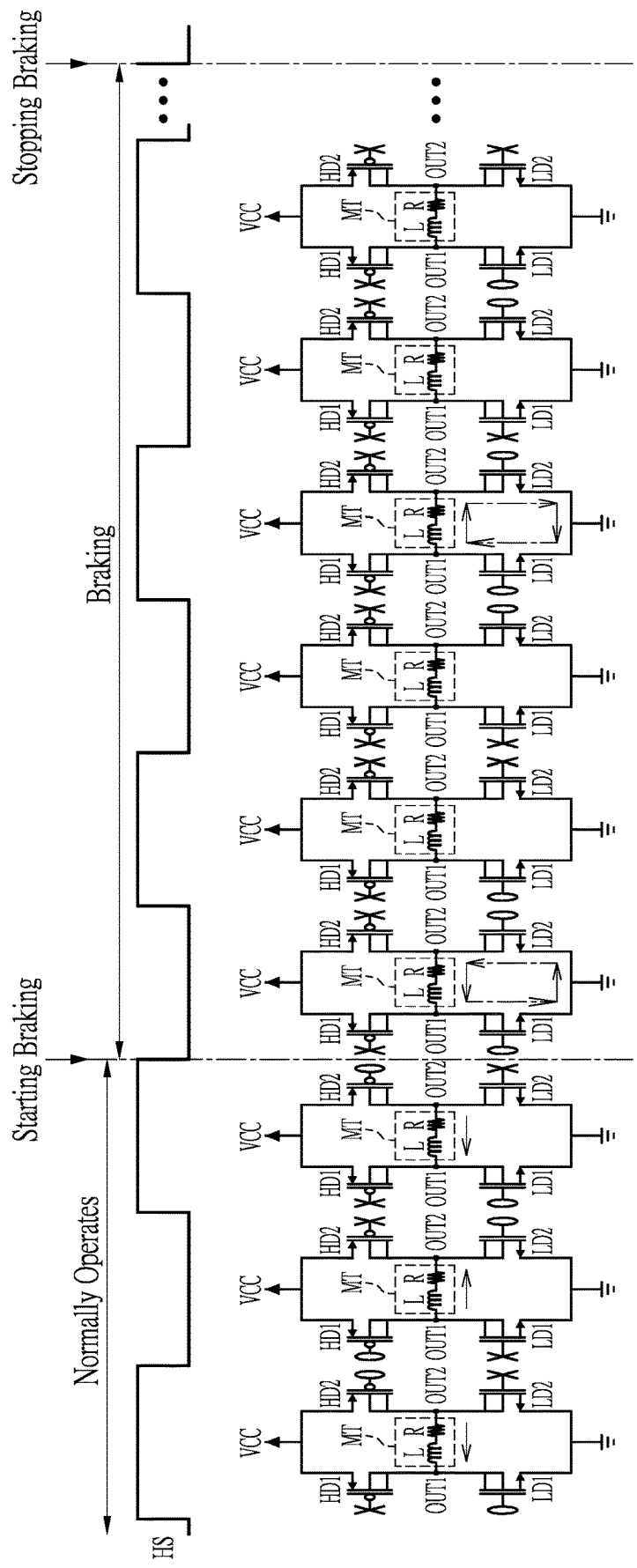
FIG. 4 is a schematic diagram of switching of the bridge circuit of the brake control system of the motor according to the embodiment of the present disclosure.

Reference is made to FIGS. 1 and 4, in which FIG. 1 is the block diagram of the brake control system of the motor according to the embodiment of the present disclosure, and FIG. 4 is a schematic diagram of switching of the bridge circuit of the brake control system of the motor according to the embodiment of the present disclosure.

In the embodiment of the present disclosure, the brake control system of the motor may include a Hall sensor 100. The Hall sensor 100 may be connected to the control circuit 200. The Hall sensor 100 may sense a positive voltage and a negative voltage that are generated with a change in magnetic field strength from rotation of a rotor of the motor MT to output a Hall signal HS. The control circuit 200 may control the driver circuit 300 to drive the first high-side switch HD1, the first low-side switch LD1, the second high-side switch HD2 and the second low-side switch LD2 based on the Hall signal HS.

In a normal operation mode of the motor MT, the control circuit 200 may control the driver circuit 300 to sequentially execute a first normal switching operation and a second normal switching operation once or multiple times. Alternatively, in the normal operation mode of the motor MT, the control circuit 200 may control the driver circuit 300 to sequentially execute the second normal switching operation and the first normal switching operation once or multiple times.

In the normal operation mode of the motor MT, when a current time reaches one of a plurality of transition time points of the Hall signal HS, the control circuit 200 may control the driver circuit 300 to execute the first normal switching operation. For example, the one of the transition time points of the Hall signal HS may be a time point at which the Hall signal HS transits from a first level such as a low level to a second level such as a high level. In the first normal switching operation, the control circuit 200 may control the driver circuit 300 to fully turn on the first low-side switch LD1 and the second high-side switch HD2, and to turn off the first high-side switch HD1 and the second low-side switch LD2, at the same time.

In the normal operation mode of the motor MT, when the current time reaches a next one of the transition time points of the Hall signal HS, the control circuit 200 may control the driver circuit 300 to execute the second normal switching operation. For example, the next one of the transition time points of the Hall signal HS may be a time point at which the Hall signal HS transits from the second level such as the high level to the first level such as the low level. In the second normal switching operation, the control circuit 200 may control the driver circuit 300 to fully turn on the first high-side switch HD1 and the second low-side switch LD2, and to turn off the first low-side switch LD1 and the second high-side switch HD2, at the same time.

As described above, the first level of the Hall signal HS is the low level and the second level of the Hall signal HS is the high level, but the present disclosure is not limited thereto. In practice, the first level of the Hall signal HS may be the high level, and the second level of the Hall signal HS may be the low level.

It is worth noting that, when the motor MT operates normally and the rotational speed of the motor MT is intended to be decreased, the control circuit 200 may control the driver circuit 300 to switch the first high-side switch HD1, the first low-side switch LD1, the second high-side switch HD2 and the second low-side switch LD2, according to a level of the Hall signal HS being currently sensed by the Hall sensor 100.

More specifically, when the control circuit 200 determines that the motor MT operates normally during a first phase time of the Hall signal HS, the control circuit 200 uses an end time point of the first phase time of the Hall signal HS as a staring brake time point that is one of the transition time points of the Hall signal HS. If the Hall signal HS is at the second level (such as the high level as shown in FIG. 4) during the first phase time, the staring brake time point is a time point at which the Hall signal HS transits from the second level (such as the high level as shown in FIG. 4) to the first level (such as the low level as shown in FIG. 4).

When the current time reaches the staring brake time point, the control circuit 200 controls the driver circuit 300 to start executing the brake deceleration operation. In the brake deceleration operation, the control circuit 200 controls the driver circuit 300 to turn off all high-side switches such as the first high-side switch HD1 and the second high-side switch HD2, and to fully turn on all low-side switches such as the first low-side switch LD1 and the second low-side switch LD2, at the same time.

In the embodiment, the bridge circuit is switched at each of the transition time points of the Hall signal HS, but the present disclosure is not limited thereto. The transition time points of the Hall signal HS includes the time points at which the Hall signal HS transmits from the low level to the high level (that are time points of rising edges of waves of the Hall signal HS), and the time points at which the Hall signal HS transmits from the high level to the low level (that are time points of falling edges of the waves of the Hall signal HS).

After the brake deceleration operation is executed, a current does not flow through the first high-side switch HD1 and the second high-side switch HD2, and only flows through the first low-side switch LD1 and the second low-side switch LD2. As a result, the motor rotates inertially and the rotational speed of the motor MT is gradually decreased.

However, if the current flows through the first low-side switch LD1 and the second low-side switch LD2 for too long a period of time, the first low-side switch LD1 and the second low-side switch LD2 may be damaged due to overheating. In order to prevent this condition from occurring, after the first low-side switch LD1 and the second low-side switch LD2 are fully turned on for a period of time, the braking reset operations such as the first braking rest operation and the second braking rest operation are executed once or multiple times as described in the following description.

When the control circuit 200 determines that the current time reaches a next one of the transition time points of the Hall signal HS that is later than the staring brake time point, the control circuit 200 starts executing the first braking rest operation for a second phase time. For example, the next one of the transition time points of the Hall signal HS may be a time point at which the Hall signal HS transits from the first level such as the low level to the second level such as the high level. In the first braking rest operation, the control circuit 200 may control the driver circuit 300 to turn off the first high-side switch HD1 and the second high-side switch HD2, to turn off the second low-side switch LD2, and to fully turn on the first low-side switch LD1, at the same time. The Hall signal HS is at the second level such as the high level during the second phase time.

Then, when the control circuit 200 determines that the current time reaches a further next one of the transition time point of the staring brake time point in the Hall signal HS (such as a time point at which the Hall signal HS transits from the second level such as the high level to the first level such as the low level), the control circuit 200 controls the driver circuit 300 to start executing the second braking rest operation for a third phase time. In the second braking rest operation, the control circuit 200 controls the driver circuit 300 to turn off the first high-side switch HD1 and the second high-side switch HD2, to turn off the first low-side switch LD1, and to fully turn on the second low-side switch LD2, at the same time. The Hall signal HS is at the first level such as the low level during the third phase time.

Figure 5:
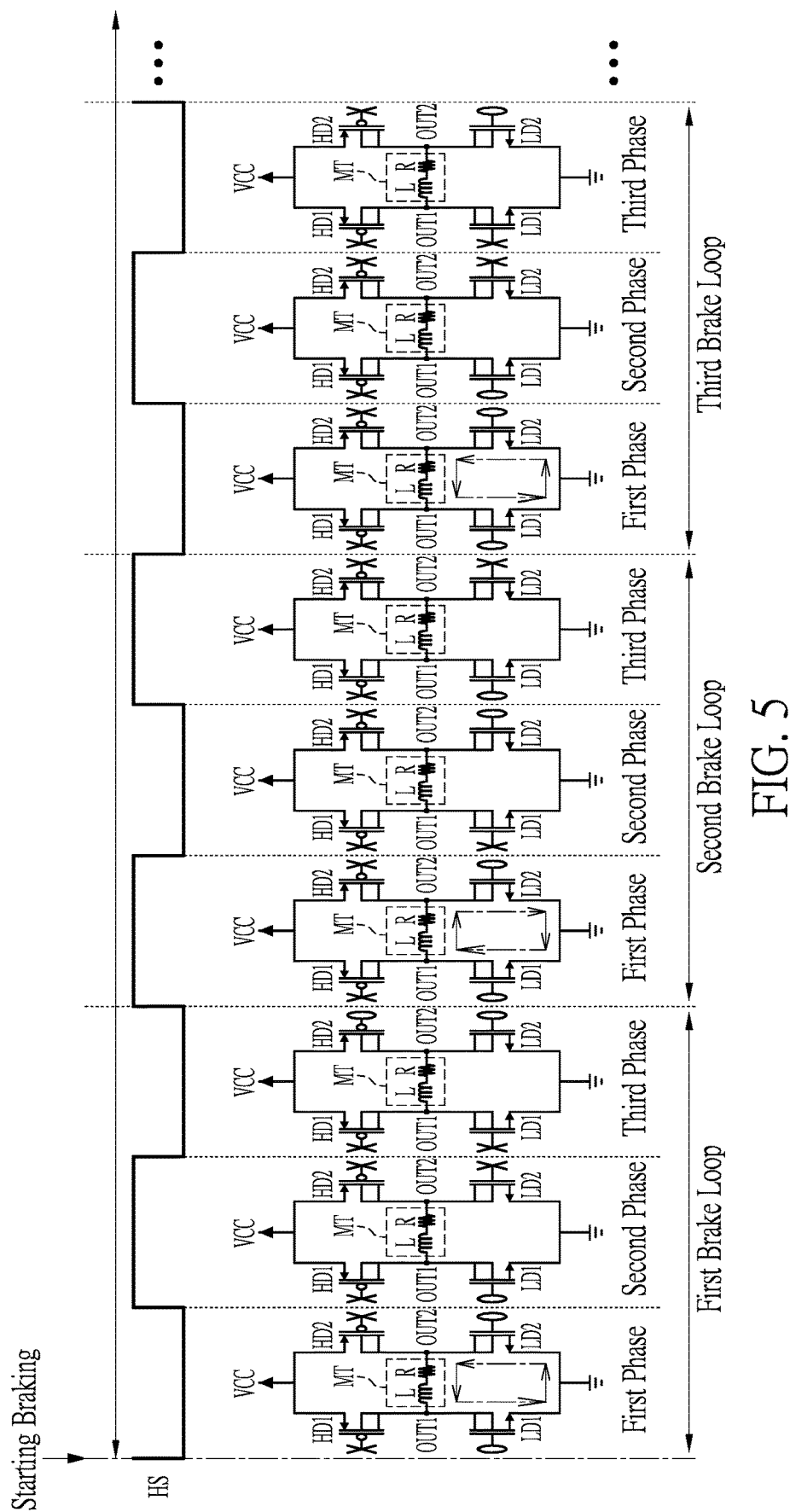
FIG. 5 is a schematic diagram of switching of the bridge circuit of the brake control system of the motor according to the embodiment of the present disclosure.

Reference is made to FIGS. 1, 4 and 5, in which FIG. 1 is the block diagram of the brake control system of the motor according to the embodiment of the present disclosure, and FIGS. 4 and 5 are schematic diagrams of switching of a bridge circuit of the brake control system of the motor according to the embodiment of the present disclosure.

The control circuit 200 may control the driver circuit 300 to sequentially execute a plurality of brake loop operations. Each of the brake loop operations may include one brake deceleration operation, one or more first braking rest operations and one or more second braking rest operations. In other words, in each of the plurality of brake loop operations, the brake deceleration operation may be executed once, the first braking rest operation may be executed once or multiple times, and the second braking rest operation may be executed once or multiple times.

For example, as shown in FIG. 5, the control circuit 200 sets each one of the brake loop operations that includes one brake deceleration operation, one first braking rest operation and one second braking rest operation. The control circuit 200 controls the driver circuit 300 to execute the brake deceleration operation once during the first phase time of the Hall signal HS. Then, the control circuit 200 controls the driver circuit 300 to the first braking rest operation once during the second phase time of the Hall signal HS. Then, the control circuit 200 controls the driver circuit 300 to execute the second braking rest operation once during the third phase time of the Hall signal HS. At this time, one of the brake loop operations is completed. After the one of the brake loop operations is completed, a next one of the brake loop operations is executed, and so on.

It should be understood that, when the rotational speed of the motor MT is intended to be decreased, the number of times of executing the brake loop operation, and the number of times of executing the first braking rest operation, and the number of times of executing the second braking rest operation in the brake loop operation, can depend on actual requirements.

That is, the control circuit 200 may control the driver circuit 300 to sequentially execute the brake deceleration operation, the first braking rest operation and the second braking rest operation once or multiple times until the rotational speed of the motor MT is decreased to reach a target rotational speed. The target rotational speed may be equal to or larger than a zero value.

Figure 6:
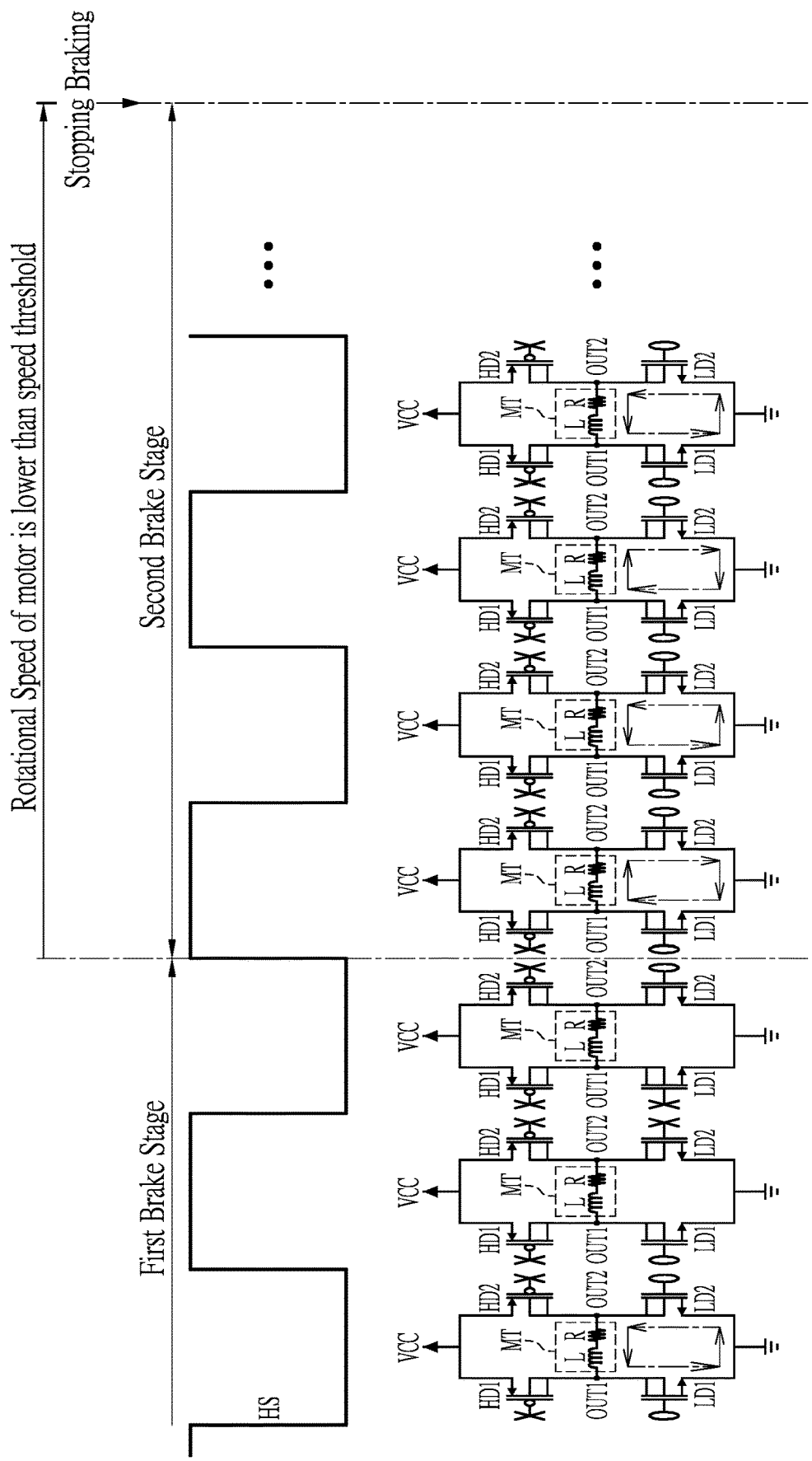
FIG. 6 is a schematic diagram of switching of the bridge circuit of the brake control system of the motor according to the embodiment of the present disclosure.

Reference is made to FIGS. 1, 4 and 6, in which FIG. 1 is the block diagram of the brake control system of the motor according to the embodiment of the present disclosure, and FIGS. 4 and 6 are schematic diagrams of switching of a bridge circuit of the brake control system of the motor according to the embodiment of the present disclosure.

When the control circuit 200 may control the driver circuit 300 to execute (a first braking stage operation including) the brake deceleration operation, the first braking rest operation and the second braking rest operation once or multiple times such that the rotational speed of the motor MT is decreased to be lower than the speed threshold, a current is smaller than a current threshold. At this time, when the current continually flows through the first low-side switch LD1 and the second low-side switch LD2, the first low-side switch LD1 and the second low-side switch LD2 are not damaged due to overheating.

Therefore, when the control circuit 200 determines that the rotational speed of the motor MT is decreased to be lower than the speed threshold, the control circuit 200 may control the driver circuit 300 to continually turn off the first high-side switch HD1 and the second high-side switch HD2, and to fully turn on the first low-side switch LD1 and the second low-side switch LD2, regardless of the level of the Hall signal HS, until the rotational speed of the motor MT is decreased to reach the target rotational speed.

That is, when the control circuit 200 determines that the current flowing through the first low-side switch LD1 and the second low-side switch LD2 is smaller than the current threshold, the control circuit 200 can control the driver circuit 300 to stop executing the first braking rest operation and the second braking rest operation (i.e., rest operations executed in a braking process), and to only continually execute the brake deceleration operation such that the rotational speed of the motor MT is more quickly decreased to reach the target rotational speed.

In summary, the present disclosure provides the braking controller system of the motor, which has at least the following characteristics:

when the rotational speed of the motor is intended to be quickly decreased, the brake deceleration operation is executed such that the first high-side switch and the second high-side switch are fully turned off and the first low-side switch and the second low-side switch are fully turned on for periods of times, or the first high-side switch and the second high-side switch are fully turned on and the first low-side switch and the second low-side switch are fully turned off for periods of times;

after the brake deceleration operation is executed for periods of times, the braking rest operations are executed, for example, in the braking rest operations, the first low-side switch and the second low-side switch are complementarily switched once or multiple times, thereby preventing the first low-side switch and the second low-side switch from being damaged due to overheating;

when the rotational speed of the motor is decreased to be lower than the speed threshold and the current flowing through the bridge circuit is decreased to be lower than current threshold, the first low-side switch and the second low-side switch can be continually turned on such that the rotational speed of the motor MT is more quickly decreased to reach the target rotational speed; and if the first high-side switch and the second high-side switch are continually turned off in the brake deceleration operation and the braking rest operations, the current cannot flow from the bridge circuit to the input voltage.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A braking controller system of a motor, comprising:
a first high-side switch, wherein a first terminal of the first high-side switch is coupled to an input voltage;
a first low-side switch, wherein a first terminal of the first low-side switch is connected to a second terminal of the first high-side switch, a second terminal of the first low-side switch is grounded, and a node between the first terminal of the first low-side switch and the second terminal of the first high-side switch is connected to a first terminal of the motor;
a second high-side switch, wherein a first terminal of the second high-side switch is coupled to the input voltage;
a second low-side switch, wherein a first terminal of the second low-side switch is connected to a second terminal of the high-side switch, a second terminal of the second low-side switch is grounded, and a node between the first terminal of the second low-side switch and the second terminal of the second high-side switch is connected to a second terminal of the motor;
a driver circuit connected to a control terminal of the first high-side switch, a control terminal of the first low-side switch, a control terminal of the second high-side switch and a control terminal of the second low-side switch; and
a control circuit connected to the driver circuit, and configured to control the driver circuit to sequentially execute a brake deceleration operation and a first braking rest operation when the control circuit intends to brake the motor;
wherein, in the brake deceleration operation, the control circuit controls the driver circuit to turn off the first high-side switch and the second high-side switch and to fully turn on the first low-side switch and the second low-side switch, or the control circuit controls the driver circuit to turn on the first high-side switch and the second high-side switch and to turn off the first low-side switch and the second low-side switch;

wherein, in the first braking rest operation, the control circuit controls the driver circuit to turn off the first high-side switch and the second high-side switch, to turn off one of the first low-side switch and the second low-side switch, and to fully turn on the other one of the first low-side switch and the second low-side switch.

2. The braking controller system according to claim 1, wherein the control circuit controls the driver circuit to sequentially execute the brake deceleration operation, the first braking rest operation and a second braking rest operation;

wherein, in the second braking rest operation, the control circuit controls the driver circuit to turn off the first high-side switch and the second high-side switch, to turn off the other one of the first low-side switch and the second low-side switch, and to fully turn on the one of the first low-side switch and the second low-side switch.

3. The braking controller system according to claim 2, wherein the control circuit controls the driver circuit to sequentially execute the brake deceleration operation, the first braking rest operation and the second braking rest operation multiple times until a rotational speed of the motor is decreased to reach a target rotational speed.

4. The braking controller system according to claim 3, wherein, when the control circuit determines that the rotational speed of the motor is decreased to be lower than a speed threshold, the control circuit controls the driver circuit to stop executing the first braking rest operation and the second braking rest operation, and then to start executing the brake deceleration operation until the rotational speed of the motor is decreased to reach the target rotational speed.

5. The braking controller system according to claim 2, wherein the control circuit controls the driver circuit to execute a plurality of brake loop operations;

wherein, in each of the brake loop operations, the control circuit controls the driver circuit to execute the brake deceleration operation once, and then to sequentially execute the first braking rest operation and the second braking rest operation once or multiple times.

6. The braking controller system according to claim 2, further comprising:

a Hall sensor connected to the control circuit and configured to sense a positive voltage and a negative voltage that are generated with a change in magnetic field strength from rotation of a rotor of the motor to output a Hall signal, wherein the control circuit controls the driver circuit based on the Hall signal.

7. The braking controller system according to claim 6, wherein, when a current time reaches one of transition time points of the Hall signal, the driver circuit starts executing the brake deceleration operation;

wherein, when the current time reaches a next one of the transition time points of the Hall signal, the driver circuit stops executing the brake deceleration operation and starts executing the first braking rest operation;

wherein, when the current time reaches a further next one of the transition time points of the Hall signal, the driver circuit stops executing the first braking rest operation and starts executing the second braking rest operation.

8. The braking controller system according to claim 7, wherein the one of the transition time points, the next one of the transition time points and the further next one of the transition time points are time points of rising edges or falling edges of waves of the Hall signal.

9. The braking controller system according to claim 6, wherein, when the control circuit determines that the Hall signal reaches a first level, the control circuit controls the driver circuit to turn off the first high-side switch and the second high-side switch, to fully turn on the first low-side switch, and to turn off the second low-side switch;

wherein, when the control circuit determines that the Hall signal reaches a second level that is different from the first level, the control circuit controls the driver circuit to turn off the first high-side switch and the second high-side switch, to fully turn on the second low-side switch, and to turn off the first low-side switch.

* * * * *